United States Patent
Püschel (12)

(10) Patent No.: US 6,557,344 B1
(45) Date of Patent: May 6, 2003

(54) HYDRAULIC DRIVE WITH SEVERAL HYDRAULIC CONSUMERS ALSO COMPRISING A DIFFERENTIAL CYLINDER

(75) Inventor: Reiner Püschel, Lohr/Main (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 10/031,807

(22) PCT Filed: May 23, 2000

(86) PCT No.: PCT/EP00/04672

§ 371 (c)(1),
(2), (4) Date: Nov. 13, 2001

(87) PCT Pub. No.: WO00/73667

PCT Pub. Date: Dec. 7, 2000

(30) Foreign Application Priority Data

May 28, 1999 (DE) .......................... 199 24 473

(51) Int. Cl.$^7$ ............................ F15B 11/16; B29C 45/68
(52) U.S. Cl. ............................ 60/422; 60/475; 60/476; 60/484
(58) Field of Search .................... 60/422, 428, 419, 60/475, 476, 484

(56) References Cited

U.S. PATENT DOCUMENTS

| 3,894,824 | A |   | 7/1975  | Wells              |        |
|-----------|---|---|---------|--------------------|--------|
| 3,962,870 | A |   | 6/1976  | Lech               | 60/486 |
| 4,907,960 | A |   | 3/1990  | Hertzer            |        |
| 5,161,373 | A |   | 11/1992 | Morikawa           | 60/484 |
| 5,443,782 | A |   | 8/1995  | Nakamura           |        |
| 5,613,361 | A | * | 3/1997  | Dantlgraber et al. | 60/484 |

FOREIGN PATENT DOCUMENTS

| CA | 605046      |    | 9/1960  |
| DE | 1804522     |    | 5/1969  |
| DE | 4008792     |    | 9/1991  |
| DE | 4334167     |    | 4/1995  |
| DE | 19621907    |    | 12/1997 |
| DE | 19621907 A1 | *  | 12/1997 |
| DE | 19640100    |    | 4/1998  |
| EP | 0516864     |    | 12/1992 |
| EP | 0911529     |    | 4/1999  |

OTHER PUBLICATIONS

RD 92 701/02.95 36 Brueninghaus Hydromatik.

* cited by examiner

*Primary Examiner*—Edward K. Look
*Assistant Examiner*—Thomas E. Lazo
(74) *Attorney, Agent, or Firm*—Martin A. Farber

(57) ABSTRACT

The invention relates to a hydraulic drive with a plurality of hydraulic consumers also comprising a differential cylinder which are located in particular on a plastics injection-molding machine. There are a first hydraulic machine and a second hydraulic machine, which can both operate as pump and as motor. A first of the two hydraulic machines is connected to a tank by means of a second port and rests against a pressure line by means of a first port, which pressure line can be connected to that working chamber of the differential cylinder which is remote from the piston rod via a shut-off valve. The second hydraulic machine is likewise connected to the pressure line by means of a first port and can be connected, by means of a second port, to a tank via a nonreturn valve which opens toward the second port and to the piston-rod-side working chamber of the differential cylinder via a shut-off valve. According to the invention, the two hydraulic machines are also used to supply at least one further hydraulic consumer with pressure medium. For this purpose, the at least one further hydraulic consumer can be connected to the pressure line via a directional control valve.

7 Claims, 1 Drawing Sheet

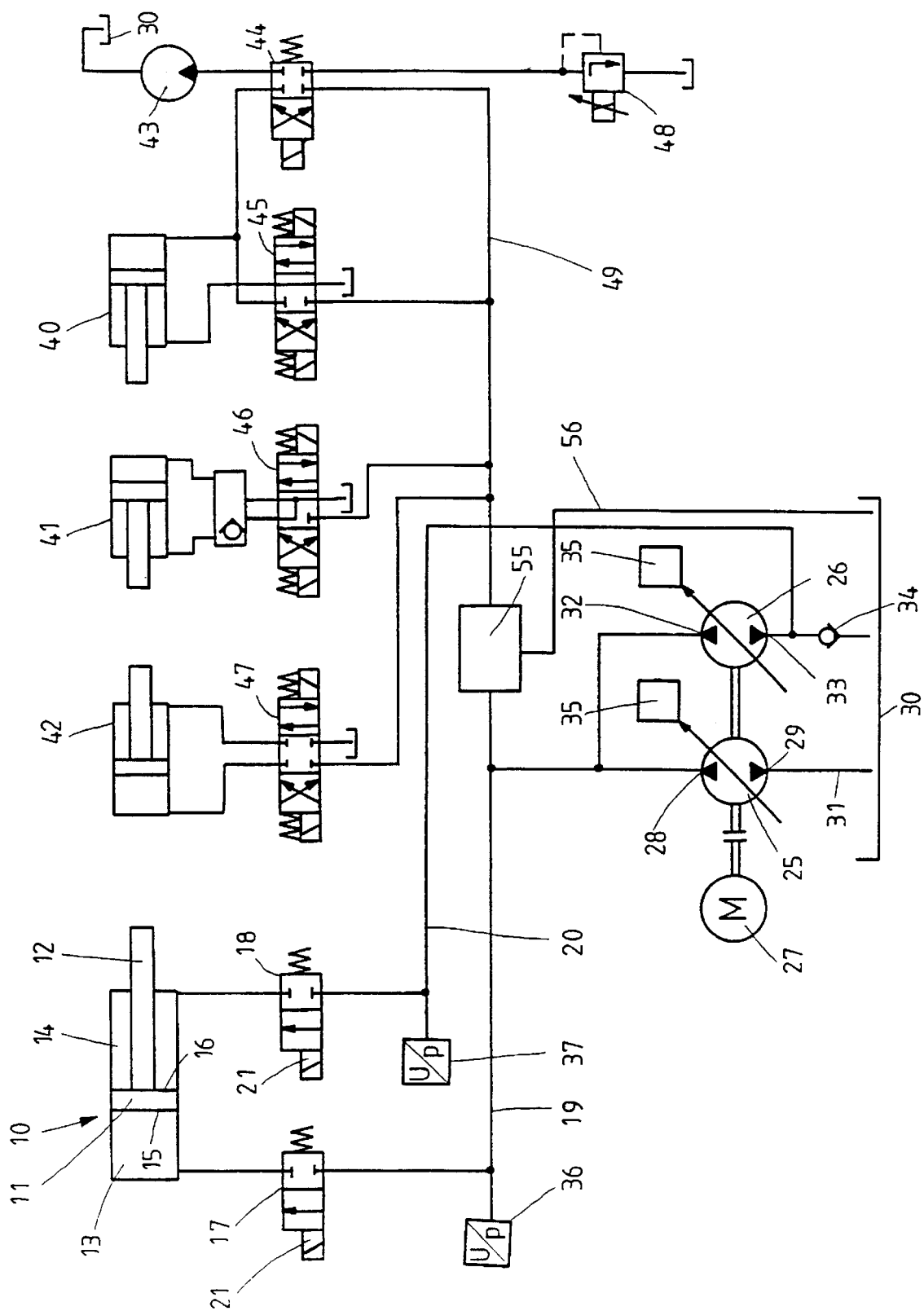

HYDRAULIC DRIVE WITH SEVERAL HYDRAULIC CONSUMERS ALSO COMPRISING A DIFFERENTIAL CYLINDER

FIELD AND BACKGROUND OF THE INVENTION

The invention relates to a hydraulic drive which comprises a plurality of hydraulic consumers, which also include a differential cylinder and which are arranged in particular on a plastics injection-molding machine.

DE 40 08 792 A1 has already disclosed a hydraulic drive with a differential cylinder and with two hydraulic machines which operate as pumps and as motors. The two hydraulic machines are used to move the piston of the differential cylinder in a stressed state, i.e. with a higher pressure level than is actually necessary in order to move the load. For this purpose, a first port of the first hydraulic machine is connected to a tank, while from the second port a pressure line leads directly to that working chamber of the differential cylinder which is remote from the piston rod. The second hydraulic machine is arranged directly between the two working chambers of the differential cylinder. Both hydraulic machines are coupled to an electric motor and can be driven at the same rotational speed by the latter. Moreover, the displacement of both hydraulic machines is adjustable. To extend the piston rod, the second hydraulic machine is set to a defined displacement, by which, assuming a constant rotational speed of the electric motor, the speed at which the piston rod is extended is determined. Then, without changing the pressures in the working chambers, the first hydraulic machine has to deliver a volume of pressure medium per unit time into the working chamber which is remote from the piston rod which precisely corresponds to the volume of the section of piston rod which has been extended per unit time. The pressure levels in the two working chambers can be changed in two ways. Firstly, the displacement of the first hydraulic machine can be increased (raising the pressure level) or reduced (lowering the pressure level) without changing the displacement of the second hydraulic machine and therefore without changing the velocity of the piston and the piston rod of the differential cylinder. Then, the two hydraulic machines together deliver a larger or smaller volume of pressure medium into that working chamber of the differential cylinder which is remote from the piston rod than the extent to which the volume of this working chamber increases, so that the pressure in this working chamber rises or falls. The pressure in the piston rod-side working chamber rises or falls accordingly. When the desired pressure level has been reached, the displacement of the first hydraulic machine is reduced or increased again. Secondly, the pressure levels can also be changed without changing the displacement of the first hydraulic machine, by reducing (raising the pressure level) or increasing (lowering the pressure level) the displacement of the second hydraulic machine. The piston of the differential cylinder then becomes slower or quicker, so that the first hydraulic machine in turn delivers more or less pressure medium than the extent to which the volume of the working chamber which is remote from the piston rod increases, and the pressure in this chamber rises or falls. By adjusting the displacement of the second hydraulic machine to the original level, the pressure change is ended and the old speed of the piston is restored.

When retracting the piston rod, it is necessary, if the pressure levels are to be constant, for the first hydraulic machine to allow a volume of oil to pass to the tank per unit time which corresponds to the volume of the piston-rod section which is retracted per unit time. To raise the pressure levels, either the displacement of the first hydraulic machine is reduced or the displacement of the second hydraulic machine is increased until the new pressure levels are reached. To lower the pressure level, either the displacement of the first machine is increased or the displacement of the second hydraulic machine is reduced until the lower pressure levels are reached.

Naturally, it is possible to adjust the two hydraulic machines in combination both when retracting the piston rod and when extending the piston rod in order to change the pressure levels.

CA 605 046 has likewise disclosed a hydraulic drive with a differential cylinder and a first hydraulic machine and a second hydraulic machine. The two hydraulic machines have a constant displacement and can be driven by an electric motor. The first hydraulic machine can, when operating as a pump, suck in pressure medium from a tank and release it into that working chamber of the differential cylinder which is remote from the piston rod. When operating as a motor, the first hydraulic machine allows pressure medium to flow out of this working chamber to the tank. The second hydraulic machine is once again arranged between the two working chambers of the differential cylinder. In this case, the two working chambers of the differential cylinder, which is used within a crane, can be blocked by means of in each case one valve which is arranged between the two ports of the second hydraulic machine and the working chambers, in order to hydraulically lock the piston and the piston rod. It is also possible for the second hydraulic machine to suck pressure medium out of the tank via a nonreturn valve and its port, which can be connected to the piston rod-side working chamber. The intention is to replace pressure medium which has been lost as a result of leakage. In this case, there is no stressed displacement of the piston of the differential cylinder, and such displacement is also not possible without additional valves when using hydraulic machines with a constant displacement.

Both the cited documents present hydraulic drives in which the two hydraulic machines are used to supply pressure medium to a single hydraulic consumer.

SUMMARY OF THE INVENTION

The invention is based on the object of constructing a hydraulic drive having features above in such a way that, without an additional hydraulic pump, at least one further hydraulic consumer can be actuated.

In a hydraulic drive of above features this object is achieved by the fact that a first port of the at least one further hydraulic consumer can be connected to the pressure line via a directional control valve, and a second port of the further hydraulic consumer can be connected to the tank. Therefore, both hydraulic machines are used, as hydraulic pumps, to supply the further hydraulic consumers with pressure medium. The second hydraulic machine sucks pressure medium out of the tank via the nonreturn valve. When the further hydraulic consumer is operating, the two working chambers of the differential cylinder are blocked by the shut-off valve(s), so that the state of the differential cylinder is not altered by operation of the further hydraulic consumer. Therefore, the two partial delivery volumes of the two hydraulic machines are available for the further consumers. This means that it is possible to use relatively small hydraulic machines.

Therefore, according to a feature of the invention, the displacement of the two hydraulic machines is adjustable. This makes it easy, as has been explained in the introduction, to allow a pressure-stressed displacement of the differential cylinder. Moreover, it is particularly expedient if the adjustable hydraulic machines can be of small nominal size. Small hydraulic machines are very quick to adjust and produce relatively little noise.

In a particularly preferred refinement at least one further hydraulic consumer can be supplied with pressure medium from both hydraulic machines via an accumulator valve which lies on the inlet side on the pressure line. The accumulator valve opens at a minimum pressure which is sufficient to adjust the delivery volume of the hydraulic machines. This ensures that the setting pressure required to adjust the hydraulic machines prevails between the ports of the hydraulic machines which are connected to the accumulator valve and the accumulator valve itself. The minimum pressure may correspond to precisely the maximum required setting pressure, but may also be selected to be higher. An accumulator valve as is advantageously used is described in DE 43 34 167 A1.

In accordance with another feature of the invention the maximum delivery volumes per unit time of the two hydraulic machines are expediently adapted to the ratio of the effective pressure faces of the differential cylinder. Therefore, for actuation of the differential cylinder, the two hydraulic machines may operate in the region of maximum adjustment, which is particularly favorable with regard to the efficiency. If the two hydraulic machines are operating at the same rotational speed, their maximum displacements, i.e. their maximum delivery volumes per revolution, are accordingly matched.

BRIEF DESCRIPTION OF THE DRAWING

An exemplary embodiment of a hydraulic drive according to the invention which is constructed for a plastics injection-molding machine is illustrated in the sole FIGURE of the drawing. The invention will now be explained in more detail with reference to this drawing.

A differential cylinder 10 having a piston 11 and a piston rod 12 is used to close and open a mold on a plastics injection-molding machine. It has a piston rod-side, annular working chamber 14 and a cylindrical working chamber 13 which is remote from the piston rod. The piston surface 15 which is exposed to the pressure in the working chamber 13 is larger by the cross section of the piston rod 12 than the annular piston surface 16 which is exposed to the pressure in the working chamber 14. Directly upstream of each working chamber 13 and 14 there is connected a shut-off valve 17 and 18, respectively, which is constructed as a 2/2-way valve, blocks off the corresponding working chamber from a line 19 or 20 in an at-rest position and can be moved into an open position by an electromagnet 21. The ratio of the areas of the piston surface 15 to the piston surface 16 is 2:1.

DETAILED DESCRIPTION OF THE PREFERRED EMBODIMENT

There are two hydraulic machines 25 and 26, which can both be operated both as a hydraulic pump and as a hydraulic motor, turn at the same rotational speed and the displacement of which can be adjusted. The two hydraulic machines are mechanically coupled to an electric motor 27 in such a manner that they can both be driven by the electric motor and can also drive the electric motor. The first hydraulic machine 25 is connected, by means of a first port 28, to the pressure line 19 which leads via the shut-off valve 17 to the working chamber 13 of the differential cylinder and, by means of a second port 29, to a tank line 31 which leads to a tank 30. Therefore, it can be used to suck pressure medium out of the tank 30 and deliver it into the pressure line 19. In this case, the hydraulic machine 25 is operating as a pump. It is also possible for pressure medium to flow out of the pressure line 19 via the hydraulic machine 25 to the tank 30. In this case, the hydraulic machine 25 is operating as a hydraulic motor. The first port 32 of the second hydraulic machine 26 is likewise connected to the pressure line 19. The second port 33 is connected to the line 20. Moreover, a nonreturn valve 34, which closes toward the tank 30 and via which the hydraulic machine 26 can suck pressure medium out of the tank, is arranged between the port 33 and the line 20, on the one hand, and the tank 30, on the other hand.

Both hydraulic machines 25 and 26 are axial piston machines and are both equipped with a pressure and delivery-flow regulator 35, as described in the Applicant's data sheet RD 92 701/02.95, at the bottom of page 36. The pressure and the displacement volume of the hydraulic machine are regulated by means of an electrically controlled proportional valve. For this purpose, the pressure which is to be regulated is recorded by an electrical pressure pick-up. In the exemplary embodiment, a first electrical pressure pick-up 36 of this type is connected to the pressure line 19 between the valve 17 and the ports 28 and 32 of the hydraulic machines 25 and 26. A second pressure pick-up 37 is connected to the line 20 between the valve 18 and the port 33 of the hydraulic pump 26.

When the piston rod 12 of the closing cylinder 10 is being extended, the hydraulic machine 25 operates as a pump, and releases pressure medium which has been sucked out of the tank 30 into the pressure line and into the working chamber 13 of the closure cylinder 10. The hydraulic machine 26 operates as a hydraulic pump or as a hydraulic motor, depending on the pressures prevailing in the working chambers 13 and 14. The pressure medium which has been displaced out of the working chamber 14 of the closure cylinder 10 likewise flows into the pressure line 19 and the working chamber 13, via the hydraulic machine 26. When the piston rod 12 is being retracted, some of the pressure medium which has been displaced out of the working chamber 13 is fed to the working chamber 14 via the hydraulic machine 26, while a further amount of this pressure medium flows away to the tank 30 via the hydraulic machine 25.

When decelerating the large mass which is to be moved using the closure cylinder, energy is recovered and is fed into the network as electrical energy via the electric motor 27.

The hydraulic drive which is illustrated has three further differential cylinders 40, 41 and 42 and a hydraulic motor 43. The hydraulic motor 43 is used to drive a worm, and the differential cylinder 40 is used to inject the plastics compound into a mold; the differential cylinder 41 is used to position the injection unit, including an injection nozzle, against the mold, and ejectors are actuated by the differential cylinder 42. One port of the hydraulic motor 43 is permanently connected to tank 30. The other port is either blocked by an electromagnetically actuable directional control valve 44 or is connected to a supply line 49. The three differential cylinders 40, 41 and 42 are each controlled by means of 4/3-way valves 45, 46 and 47 which have two consumer ports, which are connected to the working chambers of the differential cylinders, one tank port and one supply port which is connected to the supply line 49. Moreover, in the open position of the directional control valve 44, that working chamber of the injection cylinder 40 which is remote from the piston rod is connected to a proportionally adjustable pressure-relief valve 48, which can be used to set a defined pressure in said working chamber. The piston of the injection cylinder is pushed back counter to this pressure when the hydraulic motor 43 is operating. In the process, the directional control valve 45 adopts the position illustrated.

Via the supply line 49, pressure medium which has been delivered by the two hydraulic machines 25 and 26 flows to the hydraulic consumers 40 to 43. The supply line 49 is not directly connected to the pressure line 19 or to the two ports 28 and 32 of the hydraulic machines 25 and 26. Rather, an accumulator valve 55 is connected between them, by means of which accumulator valve a minimum pressure which is required for adjustment of the hydraulic machines is maintained in the pressure line 19 even when one of the consumers 40 to 43 is only generating a load pressure which is lower than the pressure required for adjustment. The accumulator valve may be constructed in accordance with German patent application DE 43 34 167 A1. A pressure-relief valve is integrated in the accumulator valve, as can be seen from the tank line 56 leading from the accumulator valve to the tank 30.

I claim:

1. A hydraulic drive with a plurality of hydraulic consumers (10, 40, 41, 42, 43) also comprising a differential cylinder (10), in particular on a plastics injection-molding machine, having a first hydraulic machine (25), which operates as a pump and as a motor and is connected, by means of a second port (29), to a tank (30) and rests against a pressure line (19) by a first port (28), which pressure line is connectable to that working chamber (13) of the differential cylinder (10) which is remote from the piston rod via a shut-off valve (17), and having a second hydraulic machine (26) which operates as a pump and as a motor and is connected, by a first port (32), to the pressure line (19) and connectable, by a second port (33), to a tank (30) via a nonreturn valve (34) which opens toward the second port (33) and via a shut-off valve (18) to the piston-rod-side working chamber (14) of the differential cylinder (10), wherein a port of at least one further hydraulic consumer (40, 41, 42, 43) is connectable to the pressure line (19) via a directional control valve (44, 45, 46, 47).

2. The hydraulic drive as claimed in claim 1, wherein displacement of the two hydraulic machines (25, 26) is adjustable.

3. The hydraulic drive as claimed in claim 2, wherein at least one further hydraulic consumer (40, 41, 42, 43) is supplyable with pressure medium from both hydraulic machines (25, 26) via an accumulator valve (55) which lies on the inlet side on the pressure line (19).

4. The hydraulic drive as claimed in claim 3, wherein maximum delivery volumes of the two hydraulic machines (25, 26) are in a ratio a-1, where a is equal to the ratio of the effective pressure faces (15, 16) of the differential cylinder (10).

5. The hydraulic drive as claimed in claim 4, wherein the two hydraulic machines (25, 26) are operated at the same rotational speed, and their displacements are in a ratio a-1.

6. The hydraulic drive as claimed in claim 2, wherein maximum delivery volumes of the two hydraulic machines (25, 26) are in a ratio a-1, where a is equal to the ratio of the effective pressure faces (15, 16) of the differential cylinder (10).

7. The hydraulic drive as claimed in claim 6, wherein the two hydraulic machines (25, 26) are operated at the same rotational speed, and their displacements are in a ratio a-1.

* * * * *